United States Patent [19]

Ellis

[11] 4,283,117

[45] Aug. 11, 1981

[54] SIDE VIEW MIRROR APPARATUS FOR VEHICLES

[76] Inventor: Harold G. Ellis, 4126 Hampton Ave., Fort Wayne, Ind. 46808

[21] Appl. No.: 101,721

[22] Filed: Dec. 10, 1979

[51] Int. Cl.³ .......................... B60R 1/06; G02B 5/12
[52] U.S. Cl. .................................... 350/289; 350/61; 350/282; 350/293; 350/300; 350/304; 219/219
[58] Field of Search .................. 350/61, 62, 282, 289, 350/293, 300, 299, 303, 304; 219/219

[56] References Cited

U.S. PATENT DOCUMENTS

| | | | |
|---|---|---|---|
| 2,514,647 | 7/1950 | Jolliffee | 219/219 |
| 2,585,273 | 2/1952 | Prutzman | 219/219 |
| 2,797,287 | 6/1957 | Prutzman | 350/61 X |
| 2,803,733 | 8/1957 | Kashirsky | 219/219 |
| 2,989,896 | 6/1961 | Bertell | 350/61 X |
| 3,132,201 | 5/1964 | Bertell et al. | 350/61 X |
| 3,135,004 | 6/1964 | Naigraw | 350/61 X |
| 3,146,296 | 8/1964 | Fischer | 350/299 X |
| 3,337,285 | 8/1967 | Travis | 350/61 X |
| 3,686,473 | 8/1972 | Shirn et al. | 350/61 X |
| 4,037,286 | 7/1977 | Medearis et al. | 350/61 X |

FOREIGN PATENT DOCUMENTS 2805911 8/1979 Fed. Rep. of Germany ............ 350/61
1277368 10/1961 France ...................................... 350/61

Primary Examiner—F. L. Evans
Attorney, Agent, or Firm—Gust, Irish, Jeffers & Hoffman

[57] ABSTRACT

This invention is a side-view mirror apparatus for vehicles. It includes a supporting frame having vertically spaced mounting members and an upright mirror assembly carried by such mounting members for rotation about an upright axis. A vertically arranged hollow shaft is secured at its upper end to the mirror assembly and is journaled for rotation in both of the mounting members. The mirror assembly includes two generally parallel back-to-back mirrors having sandwiched therebetween a planar arranged electrical heating element, one of the mirrors being non-glare. An elongated electrical conductor is received by the hollow portion of the shaft and is connected at one of its two ends to the heating element. The conductor is insulated from the shaft and a rotary drive is connected to the shaft for rotatably adjusting the mirror assembly.

8 Claims, 10 Drawing Figures

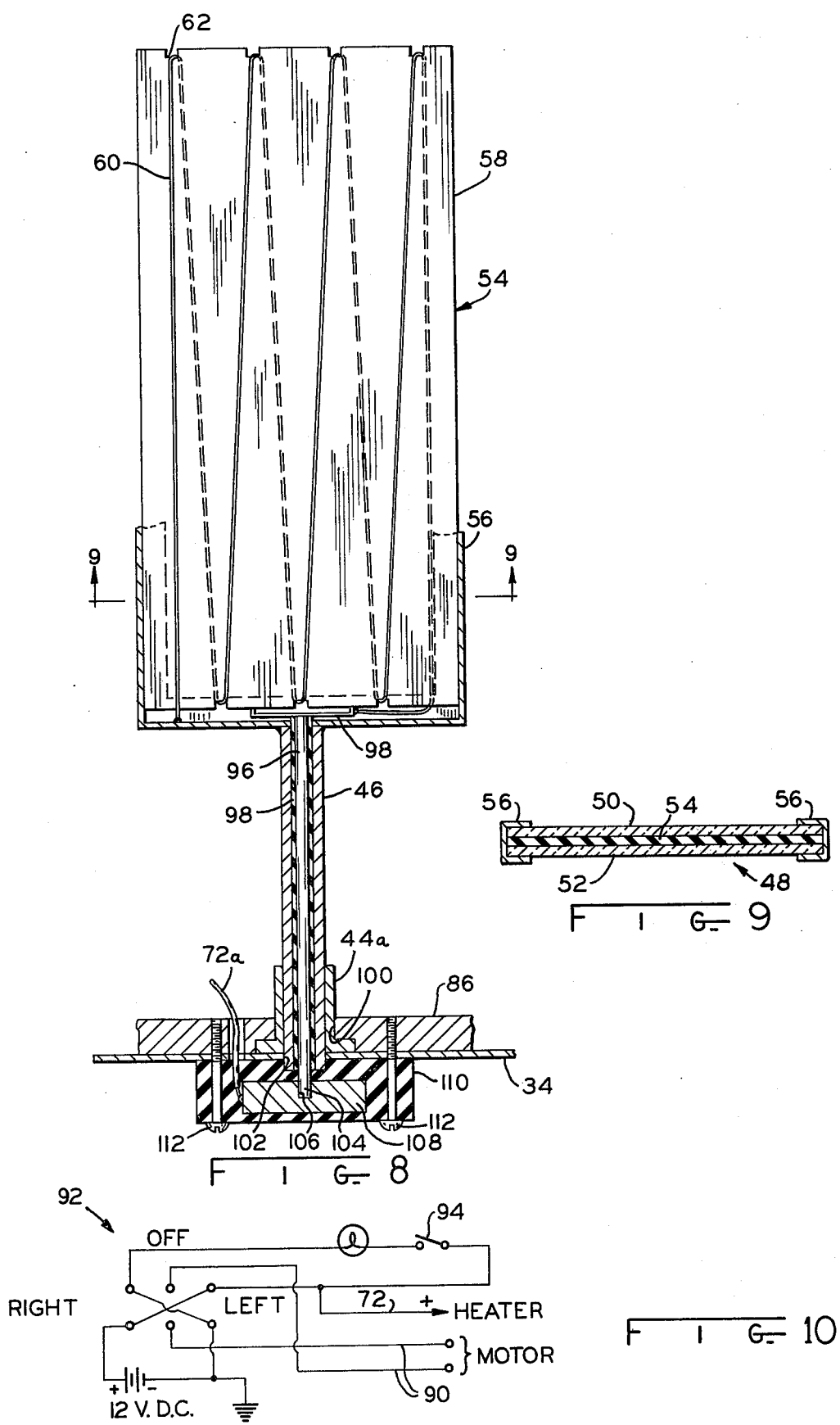

SIDE VIEW MIRROR APPARATUS FOR VEHICLES

BACKGROUND OF THE INVENTION

1. Field of the Invention

The present invention relates to side-view mirrors for vehicles and more particularly to an adjustable side view mirror apparatus having two back-to-back mirrors with one of the mirrors being of the non-glare type.

2. Description of the Prior Art

As disclosed in Kobrehel Pat. No. 3,493,295, a double, back-to-back mirror assembly is mounted for rotation on an upright shaft which may be rotated by means of a manually operated knob or an electric motor to one of two previously selected, rotational positions. The mirrors are mounted by means of ball and socket joints on the upper end of the supporting shaft, this shaft being of solid cross-section. The mirrors are spaced apart and no means are provided for applying heat thereto. Further, the two mirrors are the same type, neither being non-glare.

Other prior art is found in U.S. Pat. Nos. 137,383; 3,277,678; 3,429,639; 3,493,295; 3,596,079; 3,724,928; 3,811,755 and 3,924,938.

SUMMARY OF THE INVENTION

This invention pertains to a side-view mirror apparatus for vehicles and includes a supporting frame having vertically spaced mounting members. An upright mirror assembly is carried by and between the mounting members for rotation about an upright axis, a vertically arranged hollow shaft is secured at its upper end to the mirror assembly and further is journaled for rotation in the lower of the members. The mirror assembly includes two generally parallel back-to-back mirrors having sandwiched therebetween a planar arranged electrical heating element. Preferably, one of the mirrors is of the non-glare type. An elongated electrical conductor is received by the hollow portion of the shaft and is connected at one of its two ends to the heating element. The conductor is insulated from the shaft and means are connected to the shaft for rotatably adjusting the mirror assembly.

The conductor may be in the form of either a flexible wire or a solid rod. An electrical contactor is provided on the lower end of the wire or rod and includes two contact elements which are engaged with a sliding contact. One of the contact elements is carried by the lower end of the wire or rod and the other is stationarily mounted on the frame. A power lead is connected to the other contact element for supplying power to the heating element of the mirror assembly.

It is an object of this invention to provide an adjustable side-view mirror apparatus for vehicles wherein back-to-back mirrors may be electrically heated.

It is another object of this invention to provide a heated, adjustable, side-view mirror apparatus for vehicles wherein the side view mirror is mounted on a frame by means of an upright, hollow shaft having an elongated conductor in the central portion thereof for applying power to the heating element irrespective of the rotational position of the mirror.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings,

FIG. 8 is a partial side view of the apparatus broken away and sectioned for clarity of illustration;

FIG. 9 is a cross section of the mirror assembly taken along section line 9—9 of FIG. 8; and FIG. 10 is a diagram of the electrical circuitry used in operating the apparatus.

DESCRIPTION OF THE PREFERRED EMBODIMENT

Figure 1:
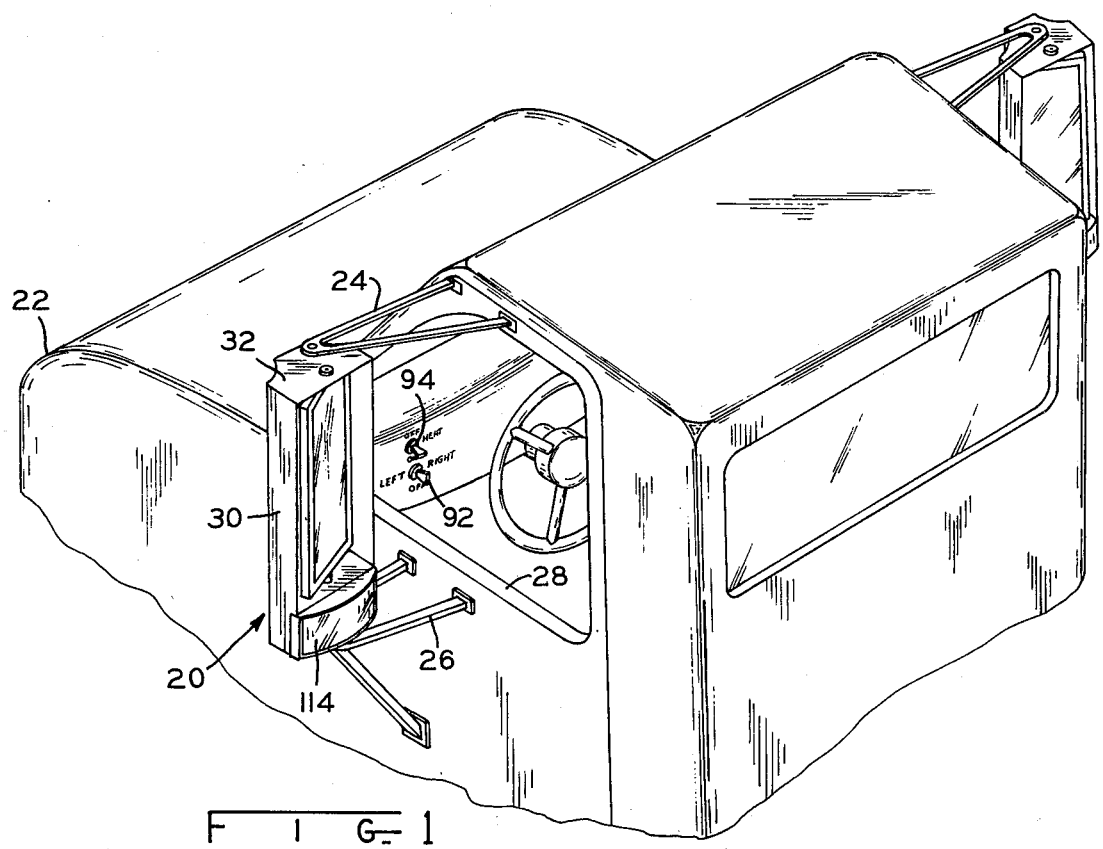
FIG. 1 is a fragmentary perspective view of the cab of a tractor for a semi-trailer vehicle having a side view mirror apparatus of this invention mounted thereon.
Figures 2, 3, 4, 5:
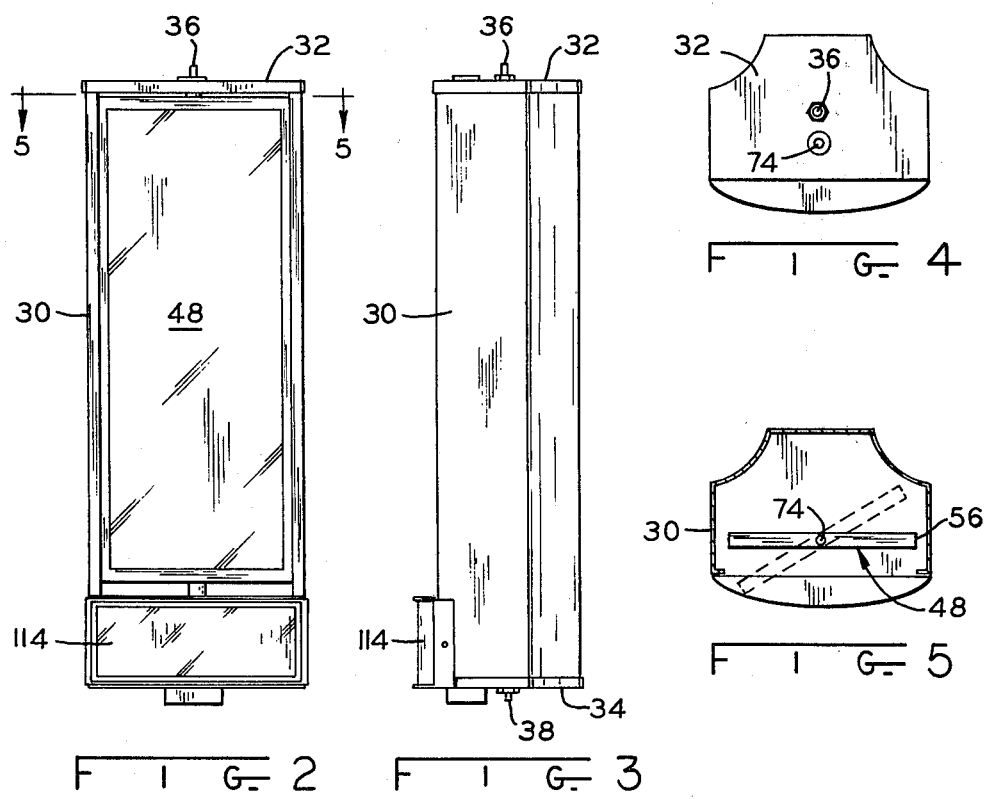
FIG. 2 is a rear view of the apparatus illustrating the rotatable mirror assembly.
FIG. 3 is a side view thereof.
FIG. 4 is a top view.
FIG. 5 is a bottom view.

Referring to the drawings, a side view mirror apparatus of this invention as generally indicated by the numeral 20 is mounted on the tractor 22 of a conventional semi-trailer vehicle. A supporting frame for the mirror apparatus 20 is composed of essentially two horizontal braces 24 and 26 which are secured to the door 28 of the tractor 22. These frame braces 24 and 26 are vertically spaced and rotationally mount the mirror apparatus 20 therebetween.

The apparatus 20 includes a frame or housing 30 closed on three sides on the upper and lower ends 32 and 34, respectively. Mounting studs 36 and 38 are provided on the upper and lower ends 32 and 34, respectively, on a common vertical axis, which rotatably fit into companion bearing portions in the frame braces 24 and 26. The housing 32 is thus adjustable about the vertical axis. A lock nut may be provided on one or both of the studs 38 for securing the housing 30 in rotationally adjusted position.

Figure 6:
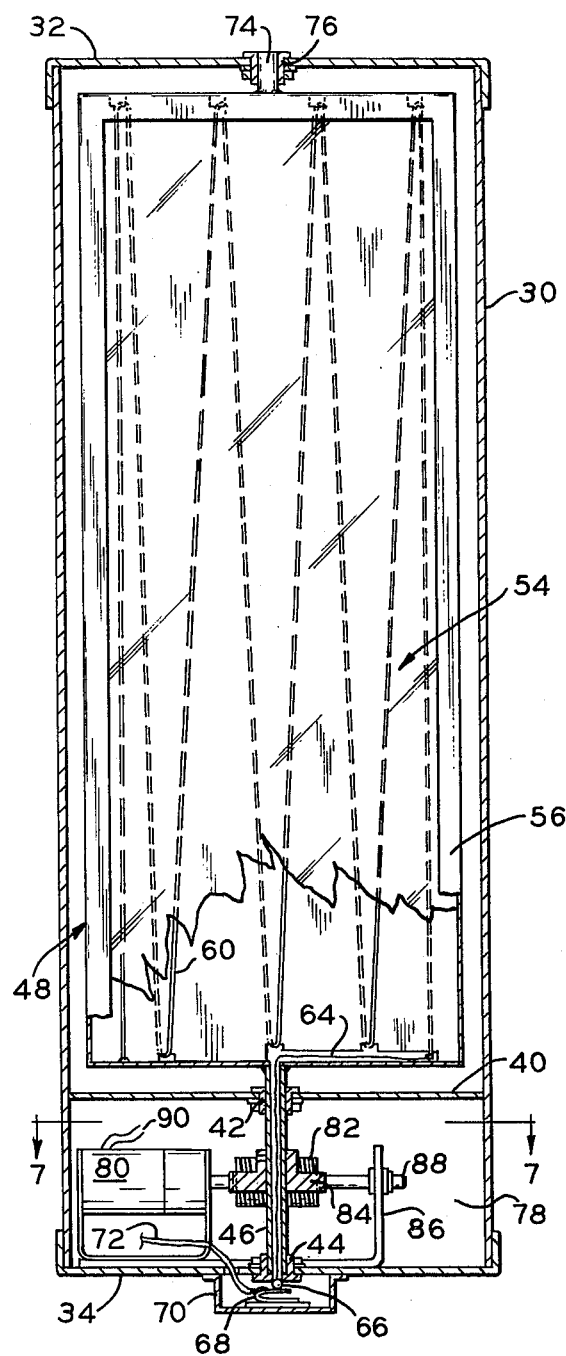
FIG. 6 is a rear view partially broken away and sectioned for clarity of illustration.
Figure 7:
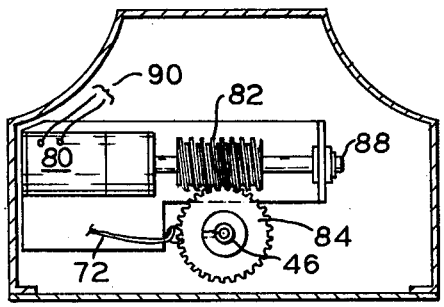
FIG. 7 is a bottom view of the apparatus with the cover plate removed showing the mirror drive assembly.

In the lower portion of the housing 30 is a transverse partition or supporting member 40 parallel to and spaced above the lower housing end 34 as shown in FIG. 6. Two bushings 42 and 44 are provided in the supporting member 40 and end 34 in vertically aligned relation, these bushings 42 and 44 receiving for rotation a hollow, metal shaft 46 connected at its upper end to a mirror assembly indicated by the numeral 48.

The mirror assembly includees two flat mirrors 50 and 52 (see FIG. 9) in back-to-back relation which sandwiches therebetween a heating element 54. The mirrors 50 and 52 are retained in a metal frame 56 to which the upper end of the shaft 46 is rigidly secured. The heating element 54 includes a flat sheet 58 of insulating material, such as fiberboard, having a nichrome resistance heating wire 60 coiled thereabout as shown in FIG. 8 and fitting into end notches 62. One end of the wire 60 is grounded to the metal frame 56 and the other end is connected to an insulated conductor, in the form of a wire 64 (see FIG. 6) which passes through the hollow shaft 46 to terminate at the lower end thereof.

The bushing 44 is preferably of a suitable, lubricous plastic, such as nylon, having a ball contact element 66 fixedly secured centrally thereof as shown. A resilient, spring contact element 68 engages the ball contact 66 and is mounted on a suitable bracket 70 attached to the lower housing end 34. This bracket 70 is formed of a suitable, insulating plastic material or alternatively may be metal, in which event the spring contact 68 is separated from the bracket 70 by means of an insulator (not shown). An electrical power lead 72 connects at one end to the spring contact 68.

Preferably, one of the mirrors 50 and 52 is of the non-glare type.

On the upper portion of the frame 56 is mounted a stub shaft 74. The axis of this stub shaft 74 is an extension of the axis of the shaft 46. The stub shaft 74 is rotatably received by a bushing 76 mounted on the housing end 32. Thus, the mirror assembly 48 is mounted for rotation about a vertical axis within the housing 30.

Situated in a compartment 78 between the partition 40 and lower housing end 34 is an electric motor 80 having a worm 82 engaged with a wheel or worm gear 84. The worm gear 84 is secured to the shaft 46 as shown. Energization of the motor 80 results in rotating the shaft 46 and in turn the mirror assembly 48. More specifically, the motor 80 is mounted on a U-shaped bracket 86 secured to the housing 30 with one upright leg rotatably supporting the distal end of the motor shaft 88. Power leads 90 connect to the motor 80 for selectively energizing the same.

Referring to FIG. 10, the electrical circuitry for selectively energizing the motor 80 and the heating element 54 will be described. This circuit includes a double pole double throw switch 92 which is normally biased to its center or "off" position. A single pole, single throw switch 94 is connected in circuit with the heater lead 72. As shown in FIG. 1, these switches are mounted on the dashboard of the vehicle. By operating the motor switch 92 in one direction, the direct current motor 80 will be energized in one direction, and by operating the switch oppositely, the motor will be energized oppositely. The rotational position of the mirror assembly 48 may be thus adjusted. When it is desired to heat the mirror assembly, the switch 94 is closed.

Another embodiment of this invention is shown in FIG. 8 wherein the conductor arrangement to the heating element differs from that described in the foregoing. Instead of using a flexible, insulated wire 64 this arrangement utilizes a conductive rod 96 received by the hollow shaft 46, a sleeve 98 of insulating material, such as plastic, being received over the rod 96 to insulate it from the shaft 46. The nichrome wire 60 of the heating element is connected to a cross bar or disc 98 on the upper end of the rod 96 as shown, the bar or disc 98 also being attached to the insulator 58.

The lower bushing 44a which may be either of metal or an insulating plastic is fitted into a suitable socket 100 in the motor supporting frame 86. The shaft 46 protrudes slightly below the lower housing end 34. The lower end of the shaft 46 is received by a clearance opening 102 in the lower housing end 34. The lower end 104 of the rod 96 protrudes beyond the end of the shaft 46 as shown, there to be received slidably by a socket 106 in a metallic disc 108. The rod end 104 and the disc 108 serve as relatively rotatable contact elements.

The disc 108 is encapsulated in a suitable plastic 110 which is secured to the lower housing end 34 by means of threaded fasteners 112. A power lead 72a connects to the disc 108.

As the mirror assemly 48 is rotated, the rod 96 will rotate therewith, being secured at its upper end to the insulator 58 of the heating element 54 by means of the crossbar 98. During this rotation, the lower end 104 of the rod 96 maintains electrical contact with the disc 108 by means of which power is applied to the nichrome heating wire 60.

The compartment 78 of the housing which contains the motor drive assembly is closed by means of a convex mirror 114. The mirror 114 is situated immediately beneath the mirror assembly 48 in full view of the operator of the vehicle.

In operation, the housing 30 is rotationally adjusted to the desired position on the frame supports 24 and 26 and is there locked by means of a suitable lock nut (not shown). The mirror assembly 48 is rotationally positioned by operating the switch 92 as desired by the operator of the vehicle to provide him with the rear view he desires. For night driving, if the driver desires to use the non-glare mirror, he merely operates the switch 92 for the purpose of rotating the mirror assembly about 180° to a position at which the desired view is obtained. If the mirror assembly should become fogged or iced over, the switch 94 may be closed for energizing the heating wire 60 which melts the ice and dries the moisture.

While there have been described above the principles of this invention in connection with specific apparatus, it is to be clearly understood that this description is made only by way of example and not as a limitation to the scope of the invention.

What is claimed is:

1. A side-view mirror apparatus for vehicles comprising a supporting frame having three vertically spaced horizontally extending mounting members, an upright mirror assembly carried by and between two of said mounting members for rotation about an upright axis, the third mounting member being beneath the lower of said two mounting members, said two lower members having two bushings, respectively, a vertically arranged hollow shaft secured at its upper end to said mirror assembly is journaled for rotation in said two bushings; said mirror assembly including two generally parallel back-to-back mirrors having sandwiched therebetween a planar arranged electrical heating element, an elongated electrical conductor received by the hollow portion of said shaft and connected at one of its two ends to said heating element, said conductor being insulated from said shaft, and means connected to said shaft for rotatably adjusting said mirror assembly; said means for adjusting said mirror assembly including an electric motor carried by said frame between said two lower mounting members and a worm and wheel drive connected between said motor and said shaft; said frame being in the form of a three sided housing enclosing said mirror assembly, and including a convex mirror mounted on said housing beneath said mirror assembly and juxtaposed with respect to said motor and drive, and said housing enclosing said motor and drive and said convex mirror closing the open side of said housing opposite said motor and drive.

2. The apparatus of claim 1 including a rotary electrical contactor provided on the other end of said conductor, and means connected to said rotary contactor for supplying electrical power to said heating element.

3. The apparatus of claim 2 in which said conductor is a flexible wire and said contactor includes a resilient contact element engaged with a solid contact element, one of said contact elements being connected to said other end of said conductor to rotate therewith and the other contact element being fixedly mounted on said frame.

4. The apparatus of claim 2 in which said conductor is a self-supporting rod rotatably received within said shaft, said contactor includes two engaged relatively rotatable contact elements, one contact element being carried by the other end of said rod and the other contact element being fixedly mounted on said frame, and an electrical power lead connected to said other contact element.

5. The apparatus of claim 4 wherein said one contact element is the end portion of said rod and is slidably received in a socket portion in said other contact element.

6. The apparatus of claim 5 wherein one of said mirrors is non-glare, said heating element including a flat support of insulating material having a heating wire coiled thereabout.

7. The apparatus of claim 4 wherein a tube of insulating material separates said rod from said shaft.

8. The apparatus of claim 7 including a second supporting frame, said housing being carried by said second frame for rotational adjustment about an upright axis.

* * * * *